(12) United States Patent
McClure et al.

(10) Patent No.: US 7,918,072 B2
(45) Date of Patent: Apr. 5, 2011

(54) MECHANICAL NET WRAPPER

(75) Inventors: John R. McClure, New Holland, PA (US); Mark K. Chow, Paoli, PA (US)

(73) Assignee: CNH America LLC, New Holland, PA (US)

( * ) Notice: Subject to any disclaimer, the term of this patent is extended or adjusted under 35 U.S.C. 154(b) by 201 days.

(21) Appl. No.: 12/249,288

(22) Filed: Oct. 10, 2008

(65) Prior Publication Data

US 2010/0089013 A1    Apr. 15, 2010

(51) Int. Cl.
   *B65B 49/00* (2006.01)
   *B65B 11/04* (2006.01)

(52) U.S. Cl. .............. 53/465; 53/399; 53/430; 53/587; 100/4; 100/15; 100/88

(58) Field of Classification Search .......... 53/118, 53/204, 211, 389.1, 398.2, 389.3, 399, 430, 53/465, 587; 100/4, 5, 15, 88, 89
See application file for complete search history.

(56) References Cited

U.S. PATENT DOCUMENTS

| | | | |
|---|---|---|---|
| 3,751,890 A | 8/1973 | Gay et al. | |
| 4,072,095 A | 2/1978 | Campbell et al. | |
| 4,246,743 A | 1/1981 | Anstee et al. | |
| 4,483,127 A | 11/1984 | Forkner | |
| 4,674,403 A | 6/1987 | Bryant et al. | |
| 4,956,968 A | 9/1990 | Underhill | |
| 5,226,359 A * | 7/1993 | Rempe | 100/88 |
| 5,289,672 A * | 3/1994 | Underhill | 53/587 |
| 5,479,767 A * | 1/1996 | McClure et al. | 56/343 |
| 5,687,548 A * | 11/1997 | McClure et al. | 53/399 |
| 6,021,622 A | 2/2000 | Underhill | |
| 6,209,450 B1 * | 4/2001 | Naaktgeboren et al. | 100/4 |
| 6,446,548 B2 * | 9/2002 | Chow | 100/4 |
| 6,622,455 B2 * | 9/2003 | Davis et al. | 53/399 |
| 6,675,561 B2 | 1/2004 | Davis et al. | |
| 6,722,100 B1 * | 4/2004 | Underhill | 53/118 |
| 6,817,159 B2 | 11/2004 | Sakaki et al. | |
| 7,409,814 B2 * | 8/2008 | Hood et al. | 53/587 |
| 2008/0092756 A1 * | 4/2008 | Vande Ryse | 100/5 |
| 2008/0098692 A1 * | 5/2008 | Paillet et al. | 53/211 |
| 2008/0282647 A1 * | 11/2008 | Hood et al. | 53/399 |

FOREIGN PATENT DOCUMENTS

EP    1157603 A1    11/2001
WO    2005/009112 A2    2/2005

* cited by examiner

*Primary Examiner* — Hemant M Desai
(74) *Attorney, Agent, or Firm* — Patrick M. Sheldrake; Michael G. Harms

(57) ABSTRACT

A manually operated bale wrapping apparatus for a round baler having a wrapping apparatus position indicator device which is visually observable by an operator that enables the operator to manually monitor and manipulate the wrapping apparatus, thereby reducing the need for an electronic control system on the baler to manage the operations of the bale wrapping process.

5 Claims, 5 Drawing Sheets

MECHANICAL NET WRAPPER

BACKGROUND OF THE INVENTION

The present invention relates generally to round balers with net wrapping capabilities and more particularly to a manually actuated net wrapping mechanism for a round baler that relies primarily on mechanical components in the net wrapping mechanism to provide operator feedback on the wrapping process.

In the crop packaging industry, generally a smaller part of the cattle/dairy industry, round balers have become quite prevalent for their capability of producing a conveniently sized cylindrical bale, very often automatically wrapped with a sheeting material such as net or film. Prior art round balers generally have a bale-forming chamber defined by an apron comprising an array of side-by-side belts, transverse slats trained on chains, a plurality of rolls or a combination of these various elements, e.g., rolls and belts. Crop material, such as hay, is picked up from the ground as the baler travels across the field, and is fed into a fixed or expandable chamber where it is rolled up to form a compact cylindrical hay package. While still inside the bale-forming chamber in its compacted form, the outer surface of the package is wrapped with twine or other wrapping material, such as film or net, prior to ejection of the wrapped bale from the chamber onto the ground for subsequent handling.

U.S. Pat. No. 5,289,672 and U.S. Pat. No. 4,956,968, issued to Underhill, disclose prior art round balers having a wrapping apparatus of the general nature described above. In this particular type of baler an expandable chamber is defined by a pair of fixed sidewalls, and a plurality of side-by-side belts cooperating with a series of transverse rolls, mounted between a pair of pivotally mounted arms. This arrangement of rolls and arms is commonly referred to as a sledge assembly. The chamber includes an inlet opening in the front through which crop material is fed. Also included is a pair of take up arms pivotally mounted on the main frame, between which arms a pair of guide rolls are journalled. A biasing force on the take up arms urges the outer surfaces of the guide rolls against the belts to maintain tension and thereby prevent slack from occurring in the belts during expansion and contraction of the chamber. Density of the bale can be affected by varying the force on the take up arms.

The present invention relates to a wrapping system for a round baler in which a cylindrical package of crop material (bale) is formed in a fixed or expanding chamber wherein one or more transverse forming rollers are employed. It is not uncommon in prior art round balers having this general configuration to feed the wrapping material between a pair of the transverse rollers. A supply of wrapping material is dispensed from a supply area in the baler housing into the bale forming chamber through the space between two of the transverse rolls whereupon the wrapping material comes into contact with and adheres to the outer surface of the bale as it is rotated by the rolls. The net wrapping system includes a net insertion assembly which is inserted into the space between the two transverse rolls while gripping a free end of the wrapping material to feed the end of the wrapping material into the bale forming chamber and initiate the wrapping process. The protruding portion of the insertion assembly is commonly referred to as the duckbill. Once the net is wrapped around the outer circumference of the bale, the wrapping material is severed from the supply by a knife in the wrapping apparatus.

In larger round balers, the wrapping systems generally employ a significant number of electronic components for sensing the position of various portions of the mechanism and for controlling the application of the wrapping material to the moving bale, specifically positioning of the duckbill. These controls automate the baling and bale wrapping processes to reduce the demands on the operator. An exemplar electronically controlled wrapping mechanism is disclosed in U.S. Pat. No. 4,674,403 by Bryant et al. and features an electronic control circuit for managing the baling and wrapping process. For smaller farming operations in which lower equipment cost is generally preferred over a greater degree of automation, a less complex control system or a manually actuated system is desirable.

It would be desirable to provide a mechanism for applying a wrapper to a bale in a baler that reduces the reliance on electrical control components, replacing some or all of those devices with functionally equivalent mechanical devices to enable the status of wrapping process to be monitored by an operator so that process steps may be manually initiated. Still more desirable would be an apparatus that is easily incorporated into existing round baler designs with minimal alteration of the bale wrapping mechanism.

SUMMARY OF THE INVENTION

Accordingly, it is an object of the present invention to provide an apparatus for controlling the bale wrapping process on a round baler that relies on a minimal number of electronic components for operation.

It is a further object of the present invention to provide an apparatus for controlling the bale wrapping process on a round baler that relies solely on mechanical components.

It is a further object of the present invention to provide an apparatus for monitoring the position of a bale wrapping apparatus and communicating the position information to an operator for use in manually initiated control actions.

It is a further object of the present invention to provide a mechanically operated bale wrapping apparatus that relies on manual operator actions for managing steps of the bale wrapping process and thereby creating a more economical baler wrapping system.

It is a still further object of the present invention to provide a mechanical apparatus for monitoring movement within the bale wrapping mechanism.

It is a still further object of the present invention to provide a mechanical mechanism for monitoring and controlling a bale wrapping duckbill mechanism that is easily adaptable for use on a standard round baler design thereby enabling efficient manufacturing of a variety of baler models employing duckbill wrapping mechanisms.

It is a still further object of the present invention to provide a mechanically actuated bale wrapping mechanism for use in a round baler that is durable in construction, inexpensive of manufacture, carefree of maintenance, easily assembled, and simple and effective to use.

These and other objects are achieved according to the instant invention by providing a manually operated bale wrapping apparatus for a round baler having a wrapping apparatus position indicator device which is visually observable by an operator that enables the operator to manually monitor and manipulate the wrapping apparatus, thereby reducing the need for an electronic control system on the baler to manage the operations of the bale wrapping process.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
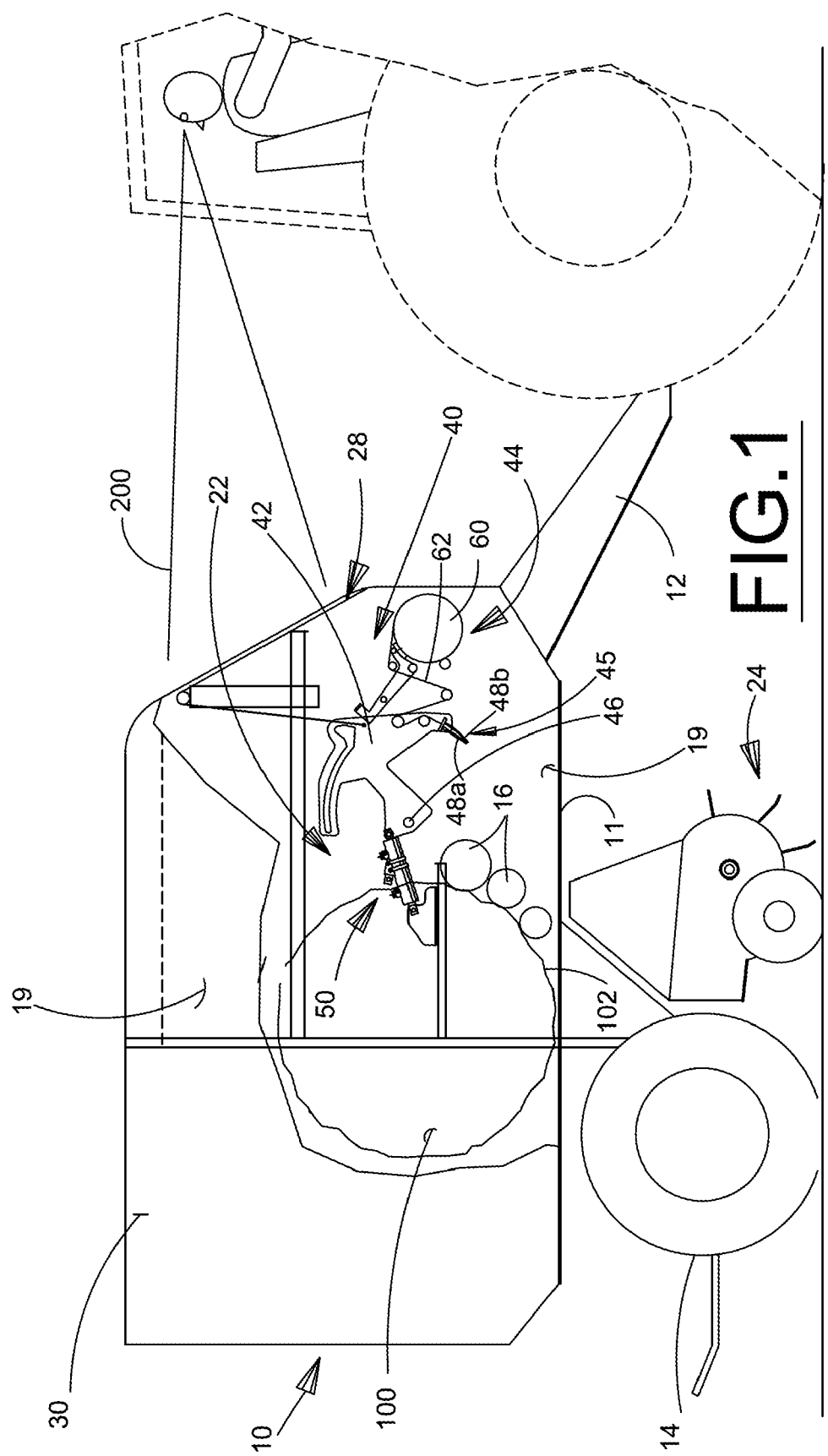
FIG. 1 is a side elevation view of a typical agricultural round baler with a side cutaway showing a bale wrapping apparatus of the type on which the present invention is useful in a first position.
Figure 2:
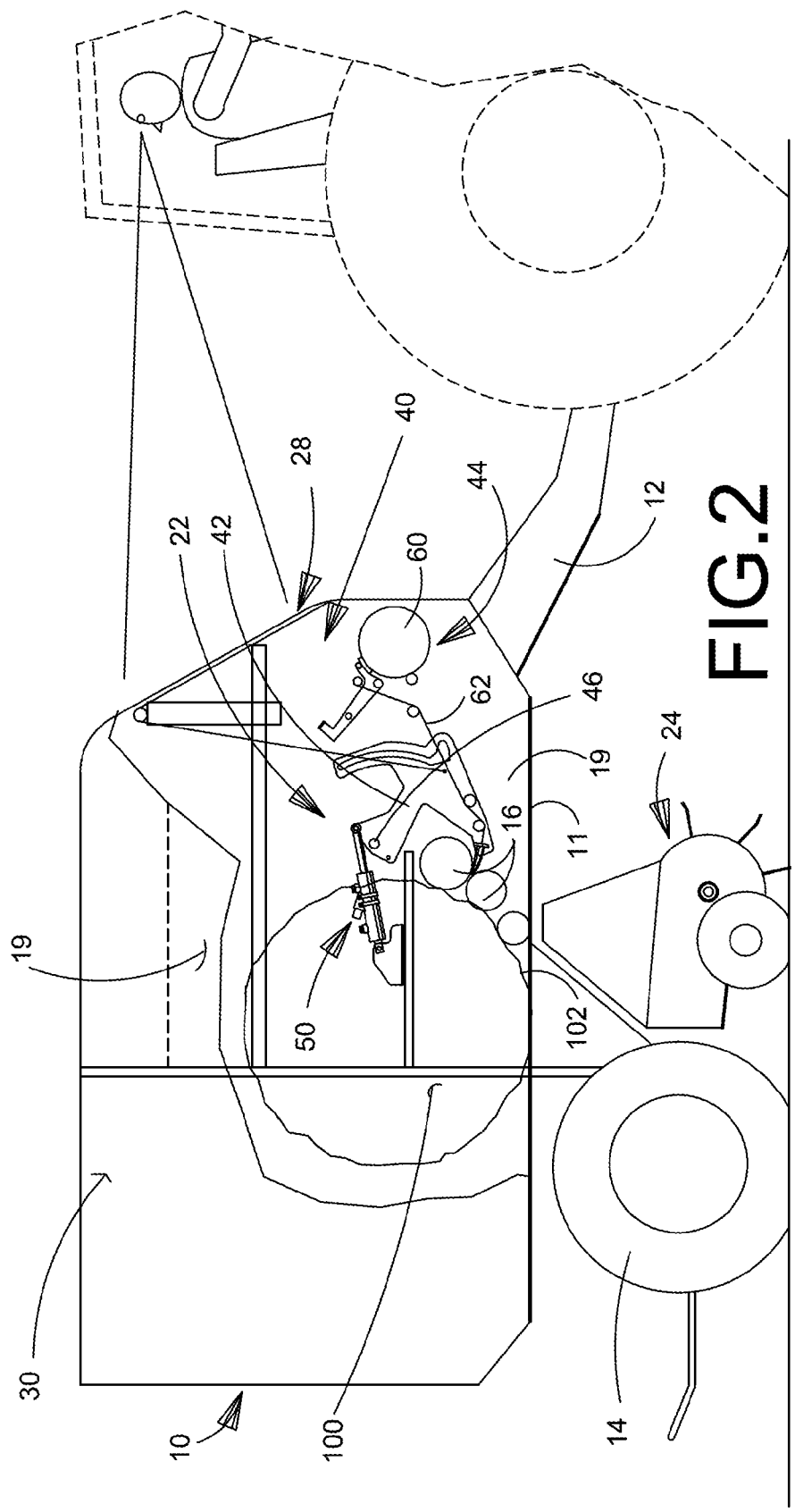
FIG. 2 is a side elevation view of the agricultural round baler in FIG. 1 in which the bale wrapping apparatus is shown in a second position.

Referring to FIGS. 1 and 2, a generally well-known round baler 10, having a wrapping apparatus 40 on which the present invention is useful, is shown to comprise a main frame 11 terminating forwardly in a tongue 12 and rearwardly slightly beyond a transverse axle to which a pair of wheels 14 (only one shown) are mounted-thus forming a wheel supported main frame. The main frame supports a series of movable belts (not shown) and rolls 16 which together with a pair of generally parallel and opposing sidewalls 19 establish an expandable bale-forming chamber 22. Other combinations of belts, rollers, and/or pulleys are also known as methods for defining the bale forming chamber and are contemplated within the scope of this invention. Cut crop material is picked up by transverse pickup 24 and fed into bale-forming chamber 22 where it is formed into a cylindrically shaped bale 100 by movement of the belts and rolls connected to a movable sledge. A completed bale, that is one that has reached a desired diameter, is then wrapped with twine or a wrapping material dispensed from the wrapping apparatus 40, to maintain the bale shape after ejection from the baler. The wrapping apparatus 40 is positioned generally behind forward shield 28 of the baler housing. Upon completion of the wrapping process, the tailgate 30 pivots upwardly to open the rearward portion of the bale forming chamber and the bale 100 is ejected onto the ground. Exemplary prior art wrapping mechanisms are shown in U.S. Pat. Nos. 4,956,968, 5,289,672, and 6,021,622, all by Underhill, the descriptive portions of which are incorporated herein by reference.

Figure 3:
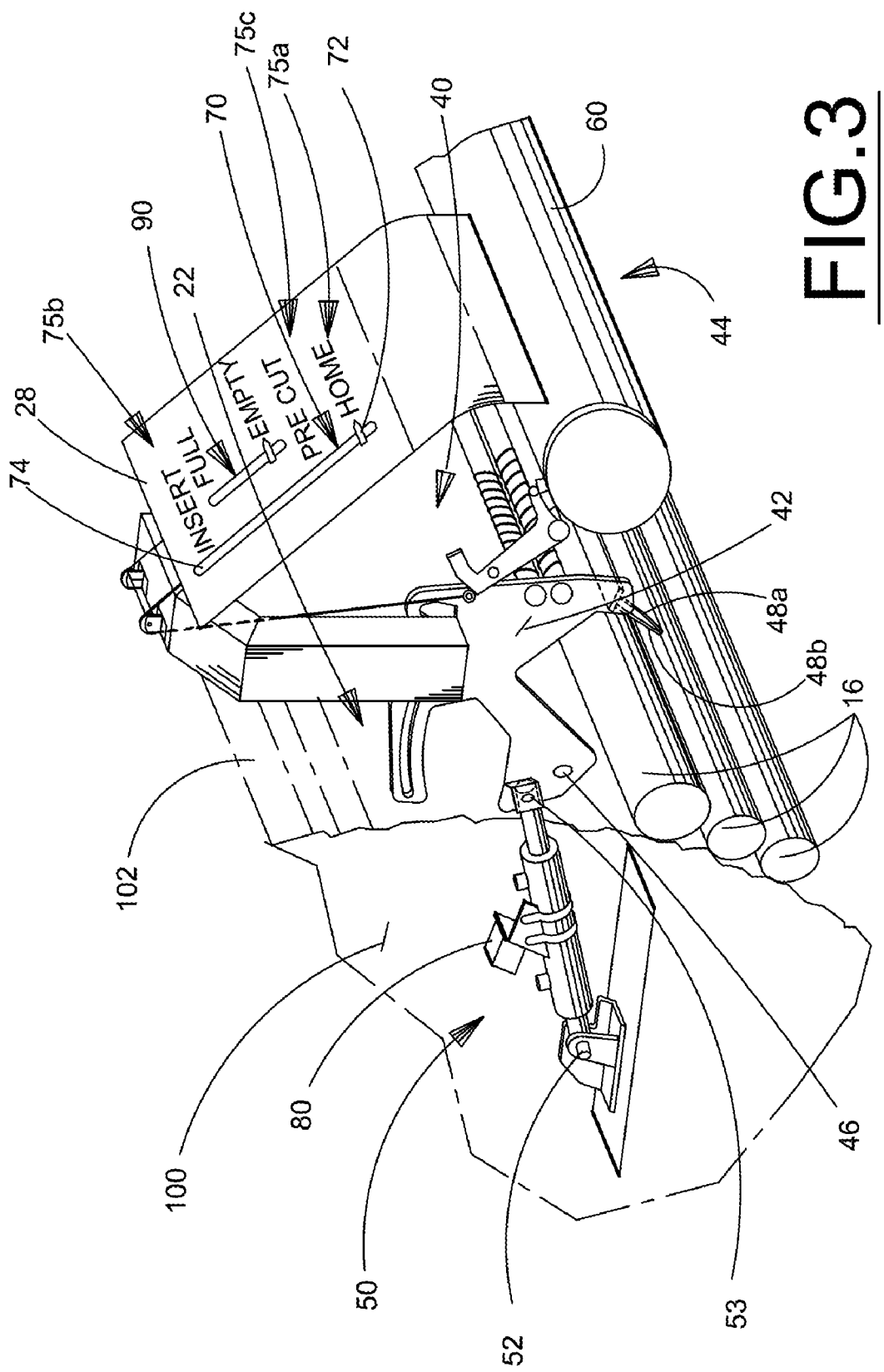
FIG. 3 is a partial perspective view of the bale wrapping apparatus showing one embodiment of a wrapping apparatus indicator of the present invention, with the wrapping apparatus in the first position.
Figure 4:
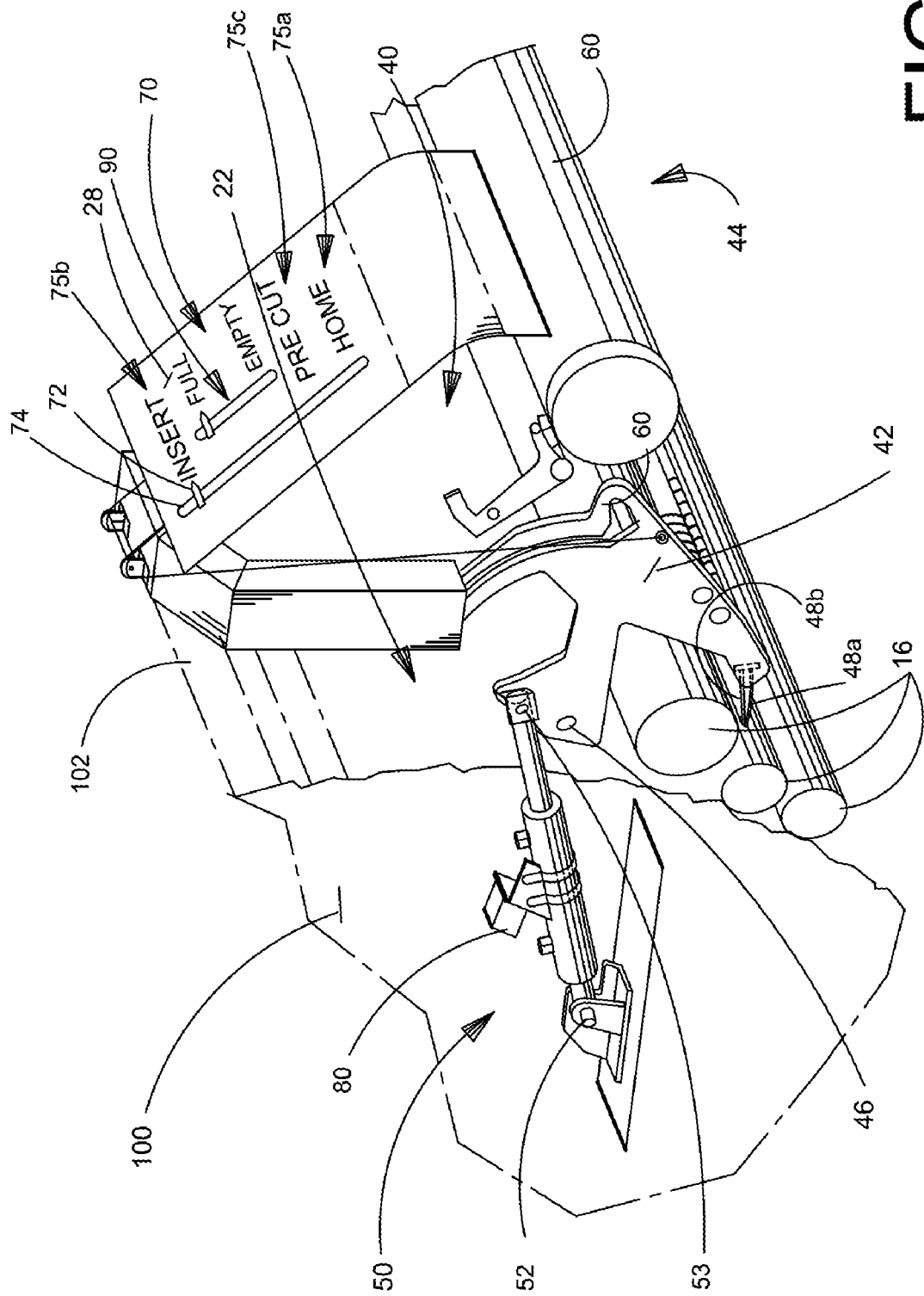
FIG. 4 is a partial perspective view of the bale wrapping apparatus showing one embodiment of a wrapping apparatus indicator of the present invention, with the wrapping apparatus in the second position.
Figure 5:
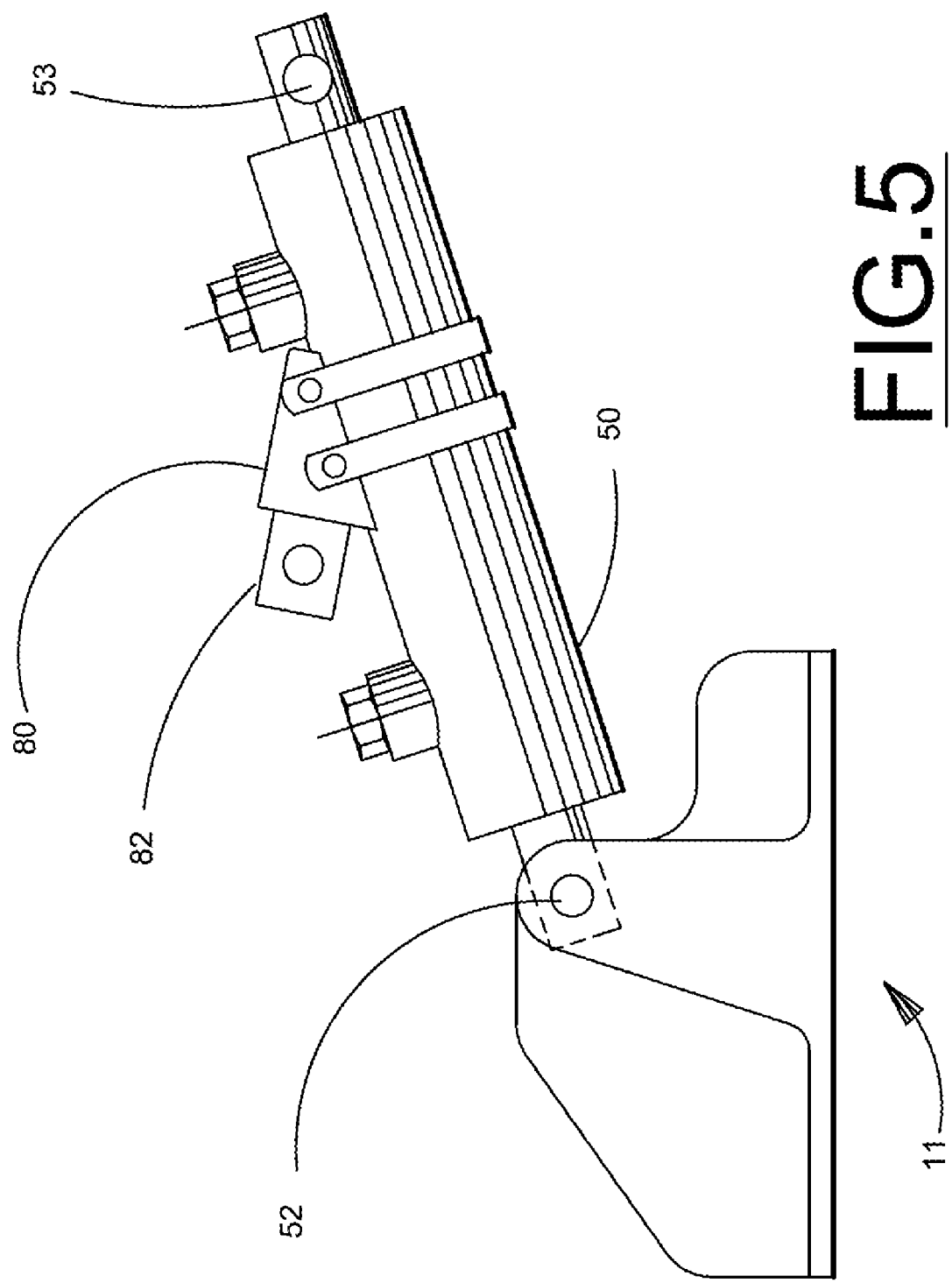
FIG. 5 is a detail view of one embodiment of an actuator for the bale wrapping apparatus.

Now referring to FIGS. 3 and 4 in conjunction with FIGS. 1 and 2, the wrapping apparatus 40 is shown to more particularly comprise net insertion mechanism 42 and a wrapping material dispenser 44. Insertion mechanism 42 is pivotally connected to the chassis at pivot point 46 thereby enabling the mechanism to move between generally opposing retracted (shown in FIGS. 1 and 3) and inserted (shown in FIGS. 2 and 4) positions. Wrapping material dispenser 44 includes a material supply 60, typically in the form of a continuous roll which is fed through the insertion mechanism 42 for application on the bale 100. Movement of insertion mechanism 42 is accomplished by an actuator 50 which interconnects the baler structure and the movable insertion mechanism 42 to cause pivotal movement about pivot point 46. As the bale is being formed in the bale chamber, the insertion mechanism 42 is fully withdrawn by actuator 50 to the inactive retracted position. Movement of insertion mechanism 42 into the inserted position allows a pair of transversely extending wrapping clamp members 48a, 48b to position the wrapping material 62 held therebetween in contact with the outer circumference 102 of the bale in the bale forming chamber whereupon the wrapping material 62 adheres to the bale and is wrapped around the bale as it is rotated within the bale forming chamber. Because of their appearance, the clamping members 48a, 48b being movable at an end of insertion mechanism 42 is commonly collectively referred to as the duckbill 45, and will be hereinafter for convenience.

Once the bale is formed and a full chamber condition is reached, a signal is generated to initiate the necessary actions for wrapping. Finished bale size signals are generally initiated by monitoring the position of the rolls defining the bale forming chamber or some portion of the belt take up mechanism. Mechanical bale size indicators may also be employed in balers on which minimizing electrical components is of paramount importance. The duckbill 45 is then moved to a fully inserted position in order to position the wrapping material so that it will contact the outer circumference 102 of the rotating bale and begin to wrap around the bale 100. Once the wrapping material begins to feed, the duckbill 45 is retracted slightly to an intermediate position while the wrapping occurs. As the circumference of the bale is completely covered by the wrapping material, generally at least two layers of material, the insertion mechanism 42 is fully withdrawn from the bale chamber. This additional retraction of the insertion mechanism 42 causes a knife integrated in the mechanism to cut the wrapping material 62 being fed from a storage roll 60 thereby separating the wrapping material in the dispenser from the wrapping material on the bale. The free end of the wrapping material 62 being fed from the dispenser is held in position by clamping members 48a, 48b in anticipation of the next wrapping cycle. The bale 100 is discharged from the baler and the wrapping apparatus is left in the fully withdrawn position for the next bale.

As wrapping apparatus for round balers have become more efficient and the controls for them increasingly complex in the pursuit of increased automation in balers, the operational sequence of the wrapping apparatus has evolved into one involving numerous powered automatic movements of the wrapping insertion mechanism and sufficient sensors to monitor its position during these movements. Control of actuator 50 and the duckbill 45, and monitoring of the duckbill position are conventionally handled by one or more electronic circuits and controllers. The result is a conveniently automated wrapping system, but one that may not offer the desired economics for certain farming operations.

In order to provide broader compatibility with tractors, the present invention strives to reduce, if not eliminate the electrical and electronic components commonly employed in net wrapping systems of the type used in round balers manufactured by common assignee CNH, and allow an operator to manually initiate, via one or more input devices positioned on the tractor, various steps in the wrapping process. In the present invention, actuator 50, which is conventionally an electrically operated linear actuator powered by the tractor's electrical system, is replaced by a hydraulic actuator powered by the tractor's remote auxiliary hydraulic circuits. In order to alleviate the need for an electronic controller to manage the movement of the actuator 50, a mechanically coupled position indicator 70 is provided to display the duckbill position to the operator having a field of view (indicated as reference 200 in FIGS. 1 and 2) so that appropriate manual control actions may be taken dependent upon the wrapping mechanism and bale positions. Position indicator 70 may also include a bale size indicator 90 for communicating the size of the bale in the bale forming chamber to the operator so he will know when the bale is completed and it is time to initiate the wrapping process. Alternatively, a simple position contact switch mounted to the sledge or other portion of the belt tension take-up mechanism may be used to trigger an alarm/buzzer to alert the operator of a completed bale condition.

In accordance with the present invention, once the bale 100 has reached the desired size and is ready for wrapping, the operator brings the tractor to a stationary position and manually manipulates the remote auxiliary hydraulic circuit connected to actuator 50 to initiate bale wrapping. The mechanically coupled duckbill position indicator 70 informs the operator when the duckbill 45 reaches the fully inserted position so that wrapping material begins to be fed into the bale forming chamber. Once the wrapping material 62 begins to be fed, the operator retracts the duckbill 45 to an intermediate position, referred to as the pre-cut position, and waits for the bale to be completely wrapped. Determining the point at which the bale is completely wrapped (generally at least two layers of wrapping material surrounding the bale circumference) may be accomplished manually by either waiting for a period of time to elapse which is determined by bale size and rotation speed, or by counting the number of bale rotations while the wrapping material is being fed into the chamber. Alternatively, a simple timer and alarm triggered by movement of the duckbill from the fully inserted to the intermediate position could easily perform the timing function and alert the operator of the proper time to manipulate the duckbill to the fully withdrawn position.

Once the bale is completely wrapped, the operator manipulates the control input to move the duckbill 45 to the full retracted position. During this movement, a knife mechanism within the duckbill assembly severs the wrapping material on the bale from the supply source and the wrapping process is completed. The operator then opens the baler tailgate to eject the completed and wrapped bale and resumes the baling operation.

As can be seen in FIGS. 3 and 4, position indicator 70 is most conveniently positioned on the forward shield 28 where it may be easily viewed by the tractor operator as the baler 10 is being operated. In one embodiment, position indicator 70 includes a pointer 72 which is movable along a guide 74, the pointer position therein in conjunction with indicia 75 on the shield surface thereby providing indication of the duckbill position. Pointer 72 indicates the "home" (home indicia 75*a*) or fully withdrawn position of the duckbill 45. This position corresponds to the duckbill position shown in FIG. 1 and represents the normal position when wrapping is not occurring, such as during bale formation. In FIG. 4, the duckbill has been repositioned to the fully inserted position, or "insert" position (insert indicia 75*b*) to initiate the wrapping process. This position corresponds to the duckbill position shown in FIG. 2. When the operator determines that the wrapping material is feeding into the bale forming chamber, the duckbill is partially withdrawn to an intermediate position while the wrapping occurs. This interim position is referred to as the "pre-cut" position with the pre-cut indicia 75*c* as shown in FIGS. 3 and 4.

Finally, in the absence of an electronic control system which can conveniently monitor the number of bales formed, a counter 80 may also be included to easily monitor the number of bales formed. In one embodiment, counter 80 is a simple mechanical counter which increments a count display with each input to the mechanism. The input may be a plunger 82 or toggle which causes a numerical display to increment each time it is acted upon. In the present invention, aligning the plunger 82 so that it is actuated each time the duckbill is cycled to the fully inserted position (once per bale cycle), provides a convenient method for counting the number of bales formed. The counter 80 would periodically reset to zero, typically prior to beginning baling operation in a field.

Alternative embodiments may rely on limited electrical sensors or components to facilitate monitoring by the equipment operator. Actuator 50 could be a conventional electrically operator device, but lacking the automated controls generally used. Completed bale indicator or alarms and wrapping cycle timers or bale revolution counters may also rely on simple electrical switches to provide indication to the operator so that manual initiation of the required wrapping actions may occur. These simple electric devices do not add the same level of complexity to the baling machine as a completely automated control system and are thus ideal for a reduced cost and complexity manual bale wrapper apparatus.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A method for applying a wrapping material to a completed bale of crop material formed in an agricultural round baler comprising the steps:

providing an operator location from which to monitor and manipulate the bale wrapping process;

providing a round baler having a forward end, an opposing rear end and opposing first and second sides, a bale-forming chamber defined by belts, a plurality of transverse rollers and/or pulleys and the opposing sides of the baler, providing a dispenser for storing a quantity of an elongate, sheet-like wrapping material for delivery to a wrapping mechanism, providing a wrapping apparatus for wrapping a bale of crop material with the sheet-like wrapping material within the bale-forming chamber prior to ejection, the wrapping apparatus having an insertion mechanism for delivering said wrapping material into the bale forming chamber through a space between two adjacent transverse rollers for contact with a bale formed therein, the insertion mechanism being selectively positionable between generally opposing inserted and retracted positions, with respect to the bale forming chamber;

providing an actuator for positioning said insertion mechanism;

providing an input device at the operator location for managing the position of said actuator;

providing a position indicator for sensing the position of the insertion mechanism and displaying the indication such that it is visually observable from the operator location, providing an alert mechanism to signal the presence of a complete bale in the bale forming chamber to the operator location;

operating the baler to gather crop material to form a bale;

pausing the crop gathering action when alerted by the alert mechanism;

initiating the wrapping process by manually actuating the input device to cause the actuator to move the insertion mechanism toward the inserted position;

observing the position indicator to determine when the insertion mechanism achieved the inserted position and suspending the insertion input to the input device;

observing the wrapping material dispenser to determine that wrapping material is being supplied to the bale forming chamber and wrapped onto the bale;

manipulating the input device to reposition the actuator and insertion device to an intermediate position as observed on the position indicator;

waiting for a predetermined period of time as the wrapping material is applied to the bale;

manipulating the input device to reposition the insertion mechanism to the retracted position, movement from said intermediate position toward said retracted position causing the wrapping material to be cut thereby separating wrapping material in the dispenser from wrapping material on the bale, observing the position indicator to confirm that the insertion mechanism has reached the retracted position; and resuming the baling operation.

2. The method of claim 1, wherein the step of waiting for a predetermined period of time as the wrapping material is applied to the bale comprises the operator visually counting the number of rotations of the completed bale while wrapping material is being applied.

3. The method of claim 1, wherein the step of waiting for a predetermined period of time as the wrapping material is applied to the bale comprises the operator waiting for a predetermined time period to elapse prior to performing the next input device manipulation step.

4. The method of claim 1, wherein said position indicator provides an indication of said insertion mechanism position when in the inserted and retracted positions as well as the intermediate position located therebetween, that is visually observable from said operator's location.

5. The method of claim 4, wherein said position indicator further comprises a guide, a movable pointer within said guide connected to and moved by said insertion mechanism, said pointer position within said being related to position of said insertion mechanism, and indicia adjacent to said guide identifying position of said insertion mechanism.

* * * * *